US006548779B2

(12) United States Patent
Takahashi et al.

(10) Patent No.: US 6,548,779 B2
(45) Date of Patent: Apr. 15, 2003

(54) SHEET HAVING MOVING CONTACTS AND SHEET SWITCH

(75) Inventors: Katsutoshi Takahashi, Miyagi-ken (JP); Naoya Iwama, Miyagi-ken (JP); Takeo Yamagata, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/908,865

(22) Filed: Jul. 18, 2001

(65) Prior Publication Data

US 2002/0017449 A1 Feb. 14, 2002

(30) Foreign Application Priority Data

Aug. 7, 2000 (JP) ....................................... 2000-244042

(51) Int. Cl.[7] ................................................ H01M 1/10
(52) U.S. Cl. ...................................................... 200/516
(58) Field of Search ................................ 200/516, 515, 200/517, 512, 406, 5 A, 302.1

(56) References Cited

U.S. PATENT DOCUMENTS 4,033,030 A * 7/1977 Robinson et al. ........... 156/230
4,400,595 A * 8/1983 Ahumada .................. 200/306
5,924,555 A * 7/1999 Sadamori et al. ........... 200/238

* cited by examiner

*Primary Examiner*—Elvin Enad
*Assistant Examiner*—M. Fishman
(74) *Attorney, Agent, or Firm*—Beyer Weaver & Thomas

(57) ABSTRACT

The present invention provides a sheet having moving contacts and a sheet switch that are constructed so as to contribute to lowering of costs by reducing the number of parts, provide satisfactory operation feeling when the moving contacts are pressed, and provide high contact reliability by preventing invasion of dust. The sheet having moving contacts comprises: a sheet having an adhesion face, made of an insulating film, which is coated with an adhesive on a lower face thereof; and a moving contact which has a domed expansion part and the upper face of which is covered with and stuck to the adhesion face of the sheet, wherein the sheet is formed with a linear slit extending toward the top of the expansion part across an outer circumferential edge of the moving contact.

5 Claims, 5 Drawing Sheets

SHEET HAVING MOVING CONTACTS AND SHEET SWITCH

BACKGROUND OF THE INVENTION

1. Field of the Invention

The present invention relates to a sheet having moving contacts used in an operation panel or the like of various types of electronic devices, and a sheet switch employing the same.

2. Description of the Prior Art

The structure of a conventional sheet having moving contacts and a sheet switch is shown in FIGS. 6 to 8. FIG. 6 is an exploded perspective view showing a sheet having moving contacts that is provided with a spacer, and FIGS. 7 and 8 are respectively a plan view and a sectional view showing a sheet having moving contacts and a sheet switch that has one sheet.

In FIG. 6, a sheet having moving contacts that is provided with a spacer comprises: moving contacts 13 each of which is a conductive plate domed at the center thereof; a sheet 11 made of an insulating film, which is coated with an adhesive on a lower face thereof and covers the upper faces of the moving contacts 13; and a spacer sheet 12 made of an insulating film, which is stuck to the lower face of the sheet 11 and has housing holes 12*a* formed to house the moving contacts 13.

The moving contacts 13 are housed in the housing holes 12*a* of the spacer sheet 12, and the domed upper faces thereof are covered and fixed by the adhesive 14 applied to the lower face of the sheet 11. The spacer sheet 12 are provided with coupling grooves 12*b* for coupling two adjacent housing holes 12*a*, whereby, when the moving contacts 13 are pressed, air within the dome of the domed moving contact 13 escapes to a different housing hole 12*a* through the coupling groove 12*b*, preventing reduction in operation feeling.

The sheet 11 and the spacer sheet 12 are provided with plural openings 11*a* and 12*c* used as holes for lighting from LED to be mounted on a circuit board and component escape holes.

A sheet having moving contacts in FIG. 7, not provided with a spacer sheet, comprises moving contacts 13 each of which is a conductive plate domed at the center thereof, and a sheet 16 made of an insulating film, which is coated with an adhesive on a lower face thereof and covers the upper faces of the moving contacts 13.

In this case, an opening 16*a* (circular hole in the drawing) comprising a wide through hole is provided in a portion of the sheet 16 intersecting with the outer circumferential part 13*b* of the moving contact 13, whereby, when the moving contact 13 is pressed, air within the domed moving contact 13 escapes to the outside through the opening 16*a*, preventing reduction in operation feeling.

A sheet switch shown in FIG. 8 comprises the sheet having moving contacts, and a circuit board 17 which is provided with a central fixed contact 17*b* and outer fixed contacts 17*a* on an upper face thereof, wherein the sheet 16 having moving contacts is stuck onto the circuit board 17 by the adhesive 14 on the lower face of the sheet 16 so that lower ends of the outer circumferential edges 13*b* of the moving contact 13 of the sheet 16 having moving contacts are abutted on the external fixed contacts 17*a*, and the top 13*a* of the moving contact 13 faces the central fixed contact 17*b*.

In the above configuration, when an operation part of a pushbutton (not shown) made of rubber or resin, disposed over the sheet switch, is pressed, the moving contact 13 pressed by a pressing part of a lower face of the operation part through the sheet 16 is inverted so that a lower face of the top 13*a* abuts on the central fixed contact 17*b*, whereby the central fixed contact 17*b* of the circuit board 17 and the outer fixed contacts 17*a* are electrically connected. If pressure to the pushbutton is removed, the resiliency of the moving contact 13 moves the top 13*a* of the moving contact 13 away from the central fixed contact 17*b*, turning the connection off.

However, in the structures of the conventional sheet having moving contacts and the sheet switch as described above, the structure of the sheet having moving contacts that is provided with a spacer has a problem in that, since the spacer sheet 12 is required, the number of parts increases, hampering cost reduction.

Also, the structure of a sheet having moving contacts employing one sheet has a problem in that, since the opening 16*a* opens largely in the direction of outer circumference of the moving contact 13, dust may invade the moving contact 13 from the opening 16*a* when the moving contact 13 returns from the inversion.

SUMMARY OF THE INVENTION

Accordingly, the present invention provides a sheet having moving contacts and a sheet switch that are constructed so as to solve the above-described problems, contribute to lowering of costs by reducing the number of parts, provide satisfactory operation feeling by driving air out of the dome of the moving contacts when the moving contacts of the sheet having moving contacts and the sheet switch are pressed, and provide high contact reliability by preventing invasion of dust.

To solve the above problems, the present invention, as first means, comprises: a sheet having an adhesion face, made of an insulating film, which is coated with an adhesive on a lower face thereof; and a moving contact which has a domed expansion part and the upper face of which is covered with and stuck to the adhesion face of the sheet, wherein the sheet is formed with a linear slit extending toward the top of the expansion part across an outer circumferential edge of the moving contact.

As second means, the slit is formed in plural locations of the outer circumferential edge of the moving contact except the top of the domed expansion part thereof.

As third means, a plurality of the moving contact are stuck to the sheet, and the slits are formed inside a virtual outer circumferential line connecting the outer circumferential edges of the moving contacts placed in the outermost portions of the sheet.

As fourth means, the sheet has openings piercing vertically inside the virtual outer circumferential line, and the slits provided in the outer circumferential edges of the moving contacts disposed in the vicinity of the openings are formed in directions different from the position of the openings.

As fifth means, the sheet switch comprises: a sheet having moving contacts comprising a sheet made of an insulating film which has an adhesion face coated with an adhesive on a lower face thereof, and linear slits, and moving contacts which have a domed expansion part and are stuck to the adhesion face of the sheet so that the linear slits extend toward the top of the expansion part across an outer circumferential edge thereof; and a circuit board on which fixed contacts are mounted, wherein the sheet having moving contacts is stuck onto the circuit board by an adhesive of a lower face of the sheet in a state in which the moving contacts are disposed so as to face the fixed contacts.

BRIEF DESCRIPTION OF THE DRAWINGS

Preferred embodiments of the present invention will be described in detail based on the followings, wherein.

DESCRIPTION OF THE PREFERRED EMBODIMENTS

Figure 1:
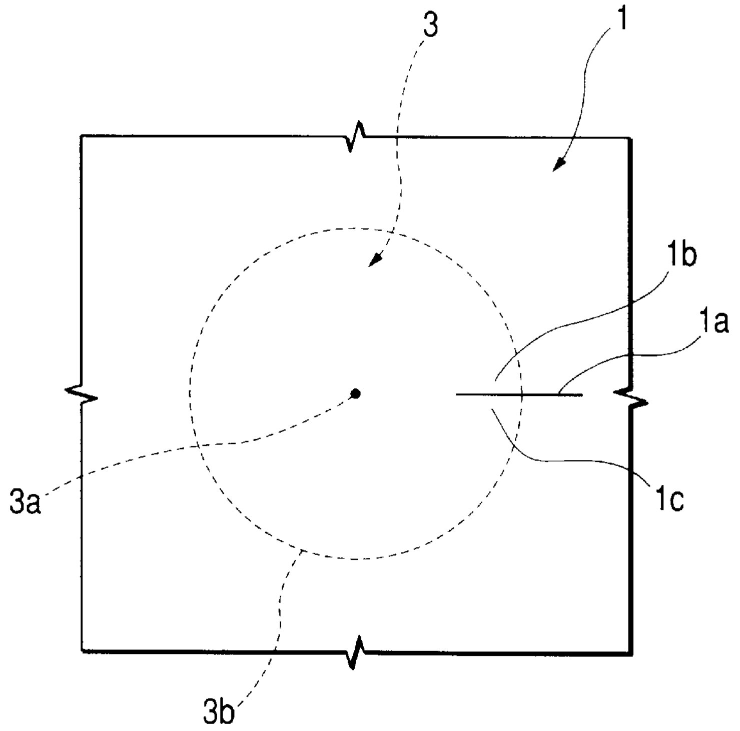
FIG. 1 is a plan view showing a sheet having moving contacts according to a first embodiment of the present invention.

Hereinafter, embodiments of the present invention are shown in FIGS. 1 to 5. FIG. 1 is a plan view showing a sheet having moving contacts of the present invention.

Figure 2:
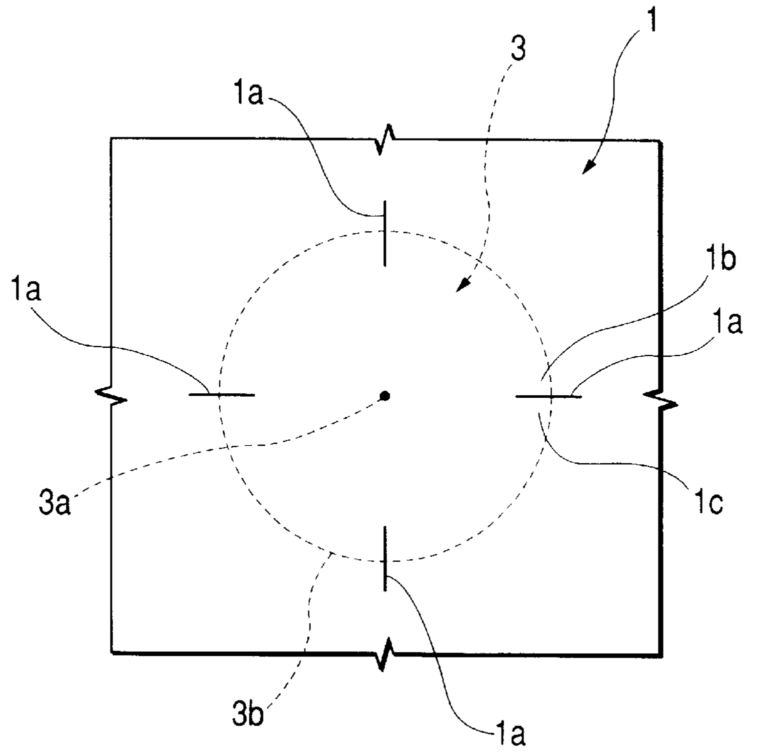
FIG. 2 is a plan view of the sheet having moving contacts of the present invention in which plural slits are provided.
Figure 3:
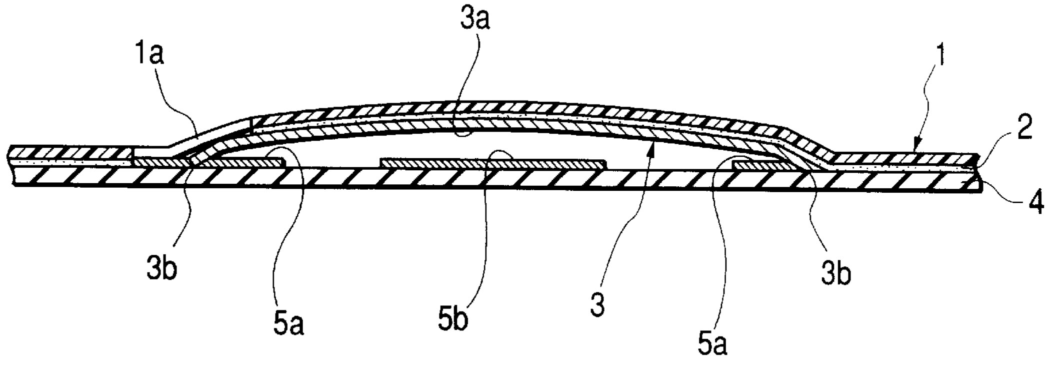
FIG. 3 is a sectional view showing a structure of a sheet switch employing the sheet having moving contacts of the present invention.
Figure 4:
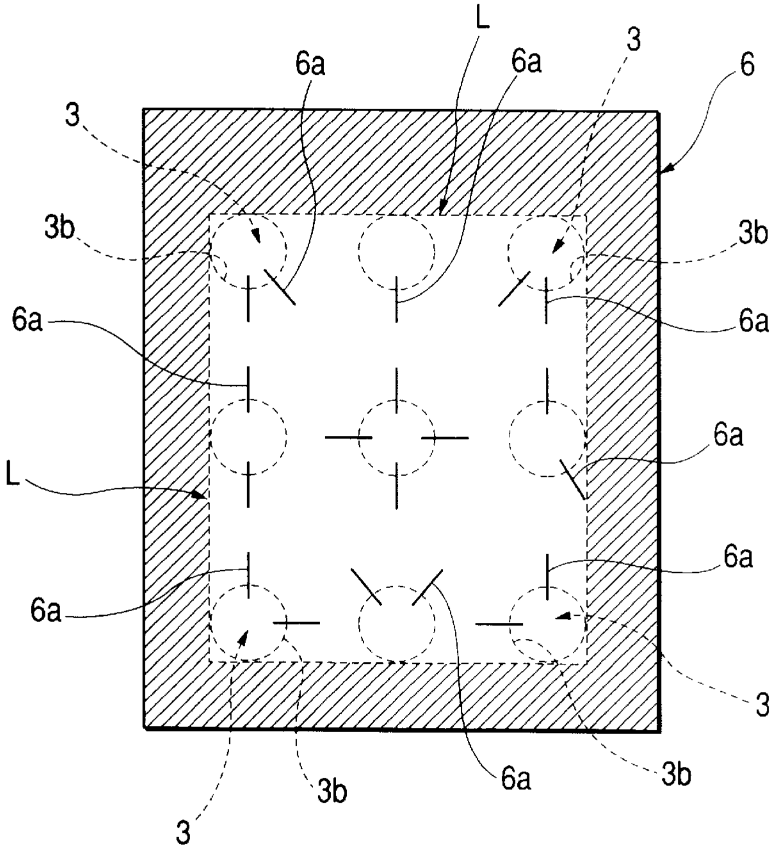
FIG. 4 is a plan view showing a sheet having moving contacts of the present invention on which plural moving contacts are disposed.
Figure 5:
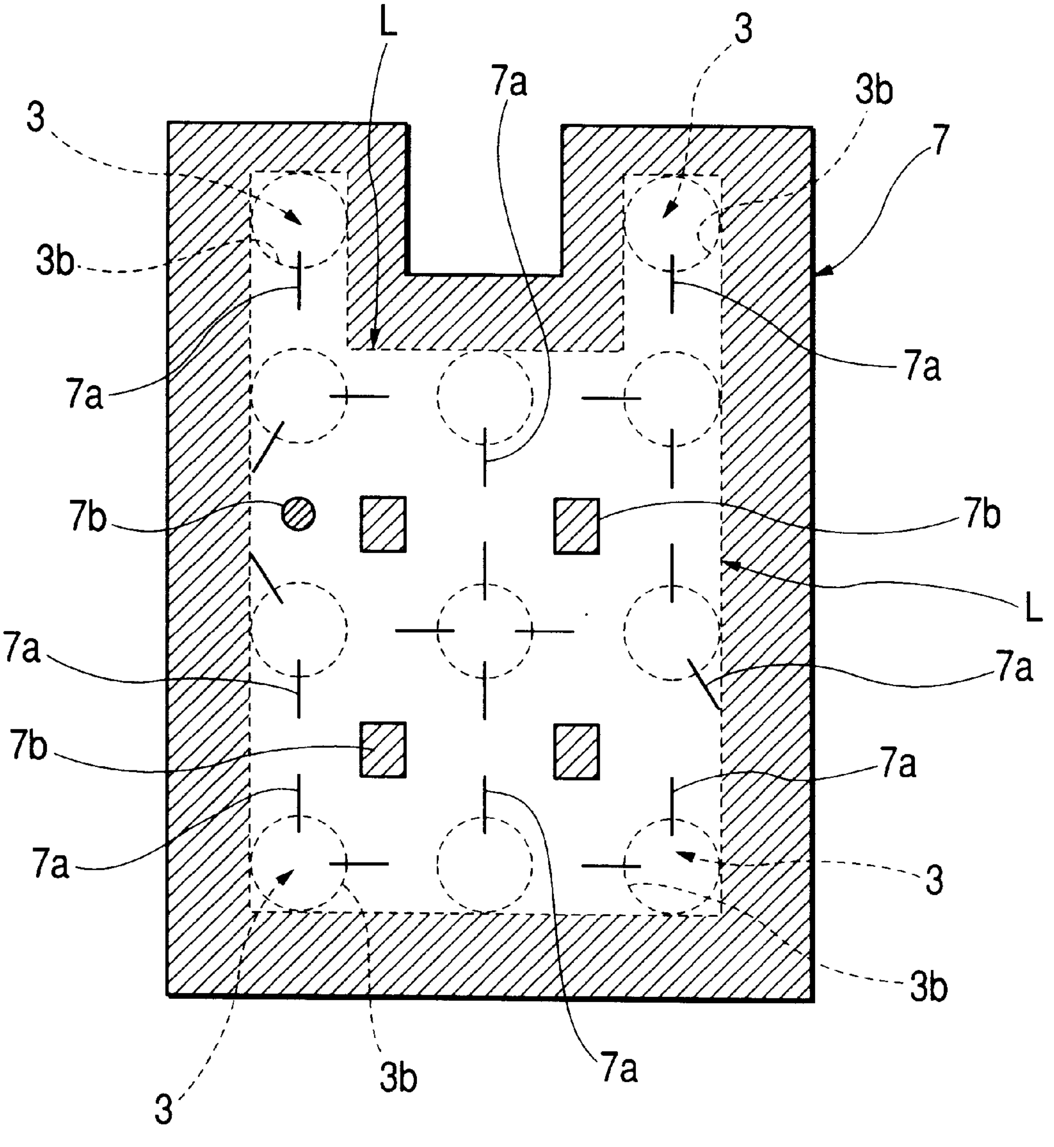
FIG. 5 is a plan view showing the sheet having moving contacts of the present invention on which openings such as holes for lighting from LED are provided.
Figure 6:
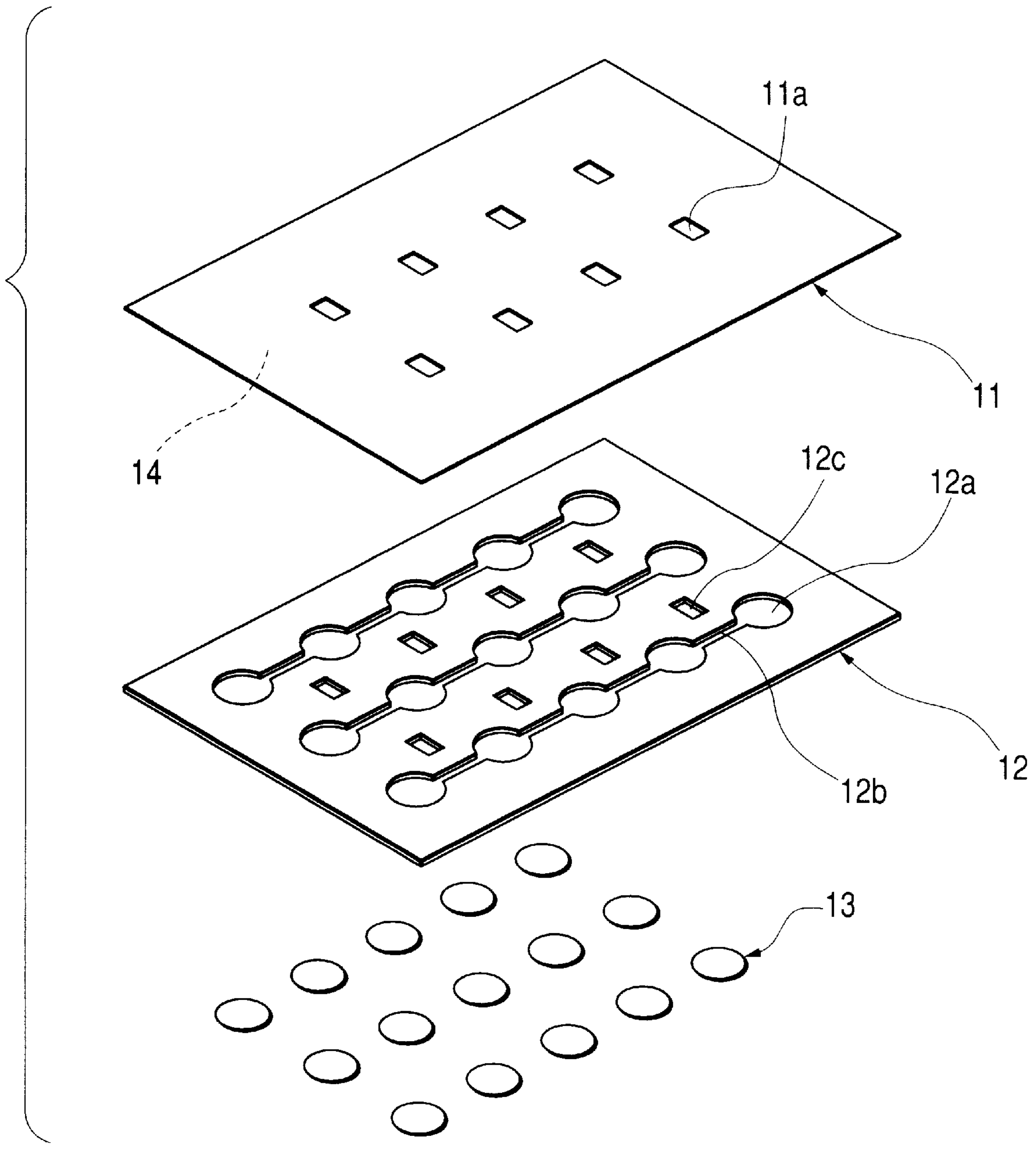
FIG. 6 PRIOR ART
FIG. 6 is an exploded perspective view showing a conventional sheet having moving contacts that is provided with a spacer.
Figure 7:
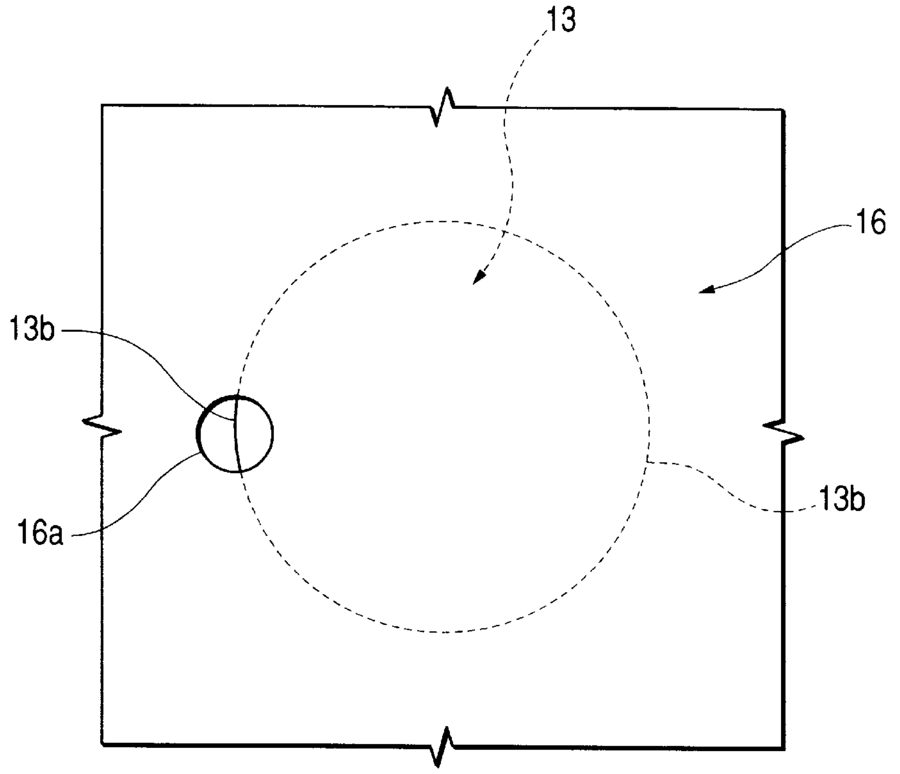
FIG. 7 PRIOR ART
FIG. 7 is a plan view showing a conventional sheet having moving contacts that has one sheet.
Figure 8:
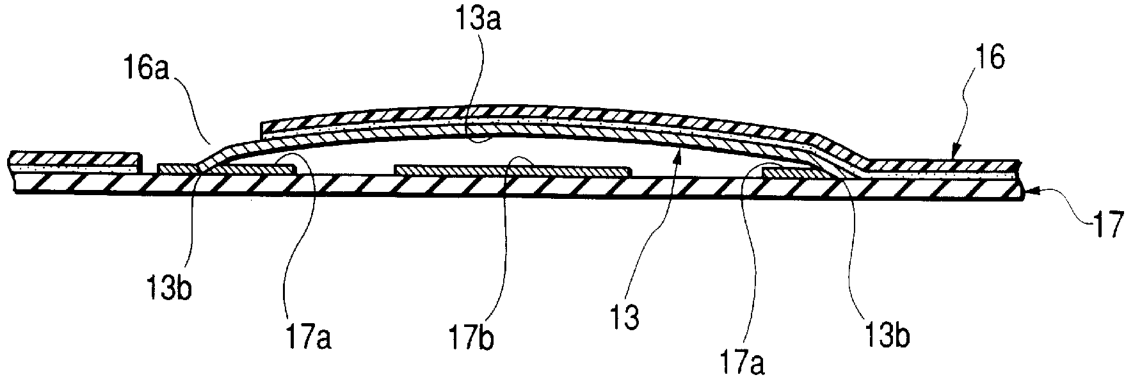
FIG. 8 PRIOR ART
FIG. 8 is a sectional view showing a sheet switch that has one sheet.

FIG. 2 is a plan view of the sheet having moving contacts in which plural slits are provided. FIG. 3 is a sectional view showing a sheet switch. FIG. 4 is a plan view showing a sheet on which plural moving contacts are disposed. FIG. 5 is a plan view showing the sheet on which holes for lighting from LED are provided.

In FIGS. 1 and 2, the sheet 1 is a filmy insulating material made of synthetic resin such as PET (polyethylene terephthalate). An adhesive 2 is applied to an entire lower face of the sheet 1, which constitutes an adhesion face which fixes a moving contact 3 described later and which is stuck onto a circuit board 4. The sheet 1 is formed with a linear slit 1*a* extending toward the top 3*a* of an expansion part across an outer circumferential edge 3*b* of the moving contact 3 described later fixed to the sheet 1. The slit 1*a* may be formed in only one location as shown in FIG. 1, or plural locations (four locations in FIG. 4) of the outer circumferential edge 3*b* except the top 3*a* of the domed expansion part of the moving contact 3, as shown in FIG. 2. The slit 1*a* is linearly formed and is cut using a die so that a cut width after cutting is equal to approximately zero.

The moving contact 3 is made of a metallic material having spring capability such as stainless or phosphor bronze and is formed so as to be expanded in the form of a dome having the top 3*a*, and the top 3*a* is inverted to an opposite side by a pressing operation from the outside. The moving contact 3 is disposed over outer fixed contacts 5*a* on the circuit board 4, and inversion by a pressing operation causes the lower face of the top 3*a* to contact or separate from the central fixed contact 5*b*, thereby performing contact switching.

To construct the sheet having moving contacts, the upper face of the dome of the moving contact 3 is stuck and fixed to the adhesion face of the adhesive 2 on the lower face of the sheet 1. In this case, as shown in FIG. 3, the sheet 1 is stuck so that the adhesion face of the adhesive 2 is curved along the domed expansion part of the upper face side of the moving contact 3. At this time, the slits 1*a* formed on the sheet 1 are positioned so as to cross the outer circumferential edge 3*b* of the moving contact 3, and in this state, the moving part 3 is fixed to the sheet 1.

FIG. 3 shows the structure of a sheet switch employing a sheet having moving contacts of the present invention, and is a sectional view showing one key portion of the sheet switch. The same parts described in FIGS. 1 and 2 are identified by the same reference numerals, and descriptions of them are omitted.

In the drawing, a circuit board 4 is formed of an insulative laminated plate or the like such as phenol resin. A circuit pattern of the outer fixed contacts 5*a* and the central fixed contact 5*b*, formed by printing carbon and the like, and etching copper foil and the like, are provided on the circuit board 4.

To construct the above-described sheet switch, the sheet having moving contacts is positioned on the circuit board 4 and stuck onto the circuit board 4 by the adhesion face of the adhesive 2 applied to the lower face of the sheet 1 so that a lower end of the outer circumferential edge 3*b* of the moving contact 3 is abutted on the outer fixed contacts 5*a*, and the top 3*a* of the moving contact 3 faces the central fixed contact 5*b*.

Next, the operation of the sheet switch will be described. When an operation part of a pushbutton (not shown) made of rubber or resin, disposed over the sheet switch, is pressed, the moving contact 13 pressed through the sheet 1 is inverted so that the top 3*a* abuts on the central fixed contact 5*b*, whereby the central fixed contact 5*b* of the circuit board 4 and the outer fixed contacts 5*a* are electrically connected. If pressure to the pushbutton is removed, the resiliency of the moving contact 3 moves the top 3*a* of the moving contact 3 away from the central fixed contact 5*b*, turning the connection off.

In the structures of the above-described sheet having moving contacts and the sheet switch, the sheet 1 is provided with the slits 1*a*, which extends linearly toward the top 3*a* of an expansion part across the outer circumferential edge 3*b* at which the moving contact 3 is fixed. With this construction, when the moving contact 3 is pressed through the sheet 1, air within the dome of the domed moving contact 3 is discharged from the outer circumferential edge 3*b* of the moving contact 3 to the outside through the slits 1*a*. As a result, since the moving contact is inverted without fail without receiving influence of air pressure within the dome, satisfactory feeling will be obtained. Also, a spacer sheet can be cut, contributing to lowering of costs.

The slits 1*a* are linearly formed and are cut using a die so that a cut width after cutting is equal to approximately zero, and are formed so as to extend linearly toward the top 3*a* of an expansion part. With this construction, when the domed moving contact 3 is inverted, two cut pieces 1*b* and 1*c* facing each other with respect to the slits 1*a* move in the same direction under close contact so that the slits 1*a* do not widen. Therefore, when the moving contact 3 is inverted, even if outside air flows into the dome of the domed moving contact 3 through the slits 1*a*, although the air is circulated by the slits 1*a*, since invasion of outside dust can be prevented, it can be prevented that dust invasion from the slits 1*a* causes contact failure.

When the moving contact 3 is fixed to the sheet 1, or when the sheet 1 is mounted on the circuit board 4, even if the sheet 1 is pulled from the top 3*a* of the expansion part of the moving contact 3 toward the outer circumferential edge 3*b*, the slits 1*a* will not widen, reducing invasion of dust.

Since the slit 1*a* is formed in plural locations of the outer circumferential edge 3*b* except the top 3*a* of the domed expansion part of the moving contact 3, the adhesive 2 never escapes from the top 3*a* of the domed expansion part of the moving contact 3 pressed, through the slits 1*a*. The smallest possible size (length) of each of the slits 1*a* would contribute to reduction in dust invasion and efficient discharge of dome air to the outside.

FIGS. 4 and 5 are plan views showing a sheet having moving contacts of the present invention on which a plurality of the moving contacts 3 are disposed; FIG. 5 is a plan view showing the sheet on which holes for lighting from LED are provided. The same parts described in FIGS. 1 to 3 are identified by the same reference numerals, and descriptions of them are omitted.

In the drawings, the sheet 6 is a filmy insulating material made of synthetic resin such as PET (polyethylene terephthalate). An adhesive 2 is applied to an entire lower face of the sheet 6, which constitutes an adhesion face which fixes a plurality of the moving contacts 3 in predetermined locations and which is stuck onto the circuit board 4. The sheet 6 is formed with plural linear slits 6*a* extending toward the top 3*a* of an expansion part across outer circumferential edges 3*b* of the plural moving contacts 3 described later fixed to the sheet 6.

The slits 6*a* are formed inside a virtual outer circumferential line L connecting the outer circumferential edges 3*b* of the moving contacts 3 placed in the outermost portions of the sheet 6. To be more specific, the slits 6*a* are placed further from an outer edge of the sheet 6 liable to form a dust invasion path, thereby further reducing influence of dust invasion from the outside.

As shown in FIG. 5, on a sheet 7 are provided openings 7*b* such as holes for lighting from LED and the like (not shown) mounted on the circuit board 4 and escape holes used during mounting of other components. The slits 7*a* provided in the outer circumferential edges 3*b* of the moving contacts 3 placed in the vicinity of the openings 7*b* are formed in directions different from positions where the openings 7*b* are formed. To be more specific, the slits 7*a* are placed further from the openings 7*b* liable to form a dust invasion path, thereby further reducing influence of dust invasion from the outside.

As has been described above, the sheet having moving contacts comprises: a sheet having an adhesion face, made of an insulating film, which is coated with an adhesive on a lower face thereof; and a moving contact which has a domed expansion part and the upper face of which is covered with and stuck to the adhesion face of the sheet, wherein the sheet is formed with a linear slit extending toward the top of the expansion part across an outer circumferential edge of the moving contact. With this construction, a spacer sheet having coupling grooves for air escape can be cut, contributing to lowering of costs, and moreover, when the moving contact is fixed to the sheet, or when the sheet is mounted on the circuit board, even if the sheet is pulled from the top of the expansion part of the moving contact toward the outer circumferential edge, the slits will not widen, reducing invasion of dust.

Since the slit is formed in plural locations of the outer circumferential edge except the top of the domed expansion part of the moving contact, the adhesive never escapes from the top of the domed expansion part through the slits. The smallest possible size (length) of each of the slits would contribute to reduction in dust invasion and efficient discharge of dome air to the outside.

Also, a plurality of the moving contact are stuck to the sheet, and the slits are formed inside a virtual outer circumferential line connecting the outer circumferential edges of the moving contacts placed in the outermost portions of the sheet. With this construction, the slits are placed further from an outer edge of the sheet liable to form a dust invasion path, thereby further reducing influence of dust invasion from the outside.

The sheet has openings piercing vertically inside the virtual outer circumferential line, and the slits provided in the outer circumferential edges of the moving contacts disposed in the vicinity of the openings are formed in directions different from the position of the openings. With this construction, the slits are placed farther from the openings liable to form a dust invasion path, thereby further reducing influence of dust invasion from the outside.

The sheet switch comprises a sheet having moving contacts comprising a sheet made of an insulating film which has an adhesion face coated with an adhesive on a lower face thereof, and linear slits, and moving contacts which have a domed expansion part and are stuck to the adhesion face of the sheet so that the linear slits extend toward the top of the expansion part across an outer circumferential edge thereof; and a circuit board on which fixed contacts are mounted, wherein the moving contacts are stuck onto the circuit board by an adhesive of a lower face of the sheet in a state in which the moving contacts are disposed so as to face the fixed contacts. With this construction, although air is circulated by the slits when the moving contacts are inverted, since invasion of outside dust can be prevented, it can be prevented that dust invasion from the slits causes contact failure.

What is claimed is:

1. A sheet having moving contacts, comprising:

a sheet having an adhesion face, made of an insulating film, which is coated with an adhesive on a lower face thereof; and a moving contact which has a domed expansion part and the upper face of which is covered with and stuck to the adhesion face of the sheet, wherein the sheet is formed with an air vent communicating with the outside of the sheet, and the-air vent is a linear slit formed through the sheet and extending toward the top of the expansion part across an outer circumferential edge of the moving contact.

2. The sheet having moving contacts according to claim 1, wherein the slit is formed in plural locations of the outer circumferential edge of the moving contact except the top of the domed expansion part thereof.

3. The sheet having moving contacts according to claim 1, wherein a plurality of the moving contact are stuck to the sheet, and the slits are formed inside a virtual outer circumferential line connecting the outer circumferential edges of the moving contacts placed in the outermost portions of the sheet.

4. The sheet having moving contacts according to claim 3, wherein the sheet has openings piercing vertically inside the virtual outer circumferential line, and the slits provided in the outer circumferential edges of the moving contacts disposed in the vicinity of the openings are formed in directions different from the position of the openings.

5. A switch comprising:

a sheet having moving contacts comprising: a sheet made of an insulating film which has an adhesion face coated with an adhesive on a lower face thereof, and linear slits formed through the sheet; and moving contacts which have a domed expansion part and are stuck to the adhesion face of the sheet so that the linear slits extend toward the top of the expansion part across an outer circumferential edge thereof so as to form air vents communicating with the outside of the sheet; and a circuit board on which fixed contacts are mounted, wherein the sheet having moving contacts is stuck onto the circuit board by an adhesive of a lower face of the sheet in a state in which the moving contacts are disposed so as to face the fixed contacts.

* * * * *